(12) United States Patent
Martinelli

(10) Patent No.: US 7,162,119 B2
(45) Date of Patent: Jan. 9, 2007

(54) PUMP ENERGY SOURCE, METHOD OF PROVIDING PUMP ENERGY TO AN OPTICAL TRANSMISSION SYSTEM, AND OPTICAL TRANSMISSION SYSTEM

(75) Inventor: Catherine Martinelli, Palaiseau (FR)

(73) Assignee: Alcatel, Paris (FR)

( * ) Notice: Subject to any disclaimer, the term of this patent is extended or adjusted under 35 U.S.C. 154(b) by 44 days.

(21) Appl. No.: 10/771,426

(22) Filed: Feb. 5, 2004

(65) Prior Publication Data

US 2004/0161190 A1    Aug. 19, 2004

(30) Foreign Application Priority Data

Feb. 18, 2003    (EP)    .................. 03003635

(51) Int. Cl.
  *G02B 6/26* (2006.01)
  *H01S 3/30* (2006.01)
(52) U.S. Cl. .............. 385/27; 372/3; 398/177
(58) Field of Classification Search ............ 385/48, 385/123; 398/177
  See application file for complete search history.

(56) References Cited

U.S. PATENT DOCUMENTS

2004/0161214 A1* 8/2004 Kajiya et al. ............... 385/123
2004/0208585 A1* 10/2004 Ranka ...................... 398/92
2004/0212871 A1* 10/2004 Hoshida et al. ............. 359/333
2004/0252999 A1* 12/2004 Onaka et al. ............... 398/177
2006/0050365 A1* 3/2006 Hainberger et al. ......... 359/334

FOREIGN PATENT DOCUMENTS

EP    1 111 741 A2    6/2001
WO    WO 02 056510 A2    7/2002

OTHER PUBLICATIONS

Patent Abstracts of Japan, Vo. 2002, No. 02, Apr. 2, 2002 corresponding to JP 2001 305594 A (Nippon Telegr) dated Oct. 31, 2001.
F. Roy et al, "Novel pumping schemes for thulium doped fiber amplifier" Optical Fiber Communication Conference (OFC) Technical digest Postconference Edition, Baltimore, MD, Mar. 7-10, 2000, NY, NY IEEE vol. 2 of 4, pp. 14-16, XP002166804.

* cited by examiner

*Primary Examiner*—Frank G. Font
*Assistant Examiner*—Eric Wong
(74) *Attorney, Agent, or Firm*—Sughrue Mion, PLLC

(57) ABSTRACT

It is disclosed a pump energy source (20) for providing pump energy ($E\_p$) to an optical transmission system (100) transmitting an optical signal along an optical fiber, in particular an optical transmission system (100) in which a beam of said pump energy ($E\_p$) is introduced to said optical fiber so that said beam of said pump energy ($E\_p$) copropagates with said optical signal.

17 Claims, 3 Drawing Sheets

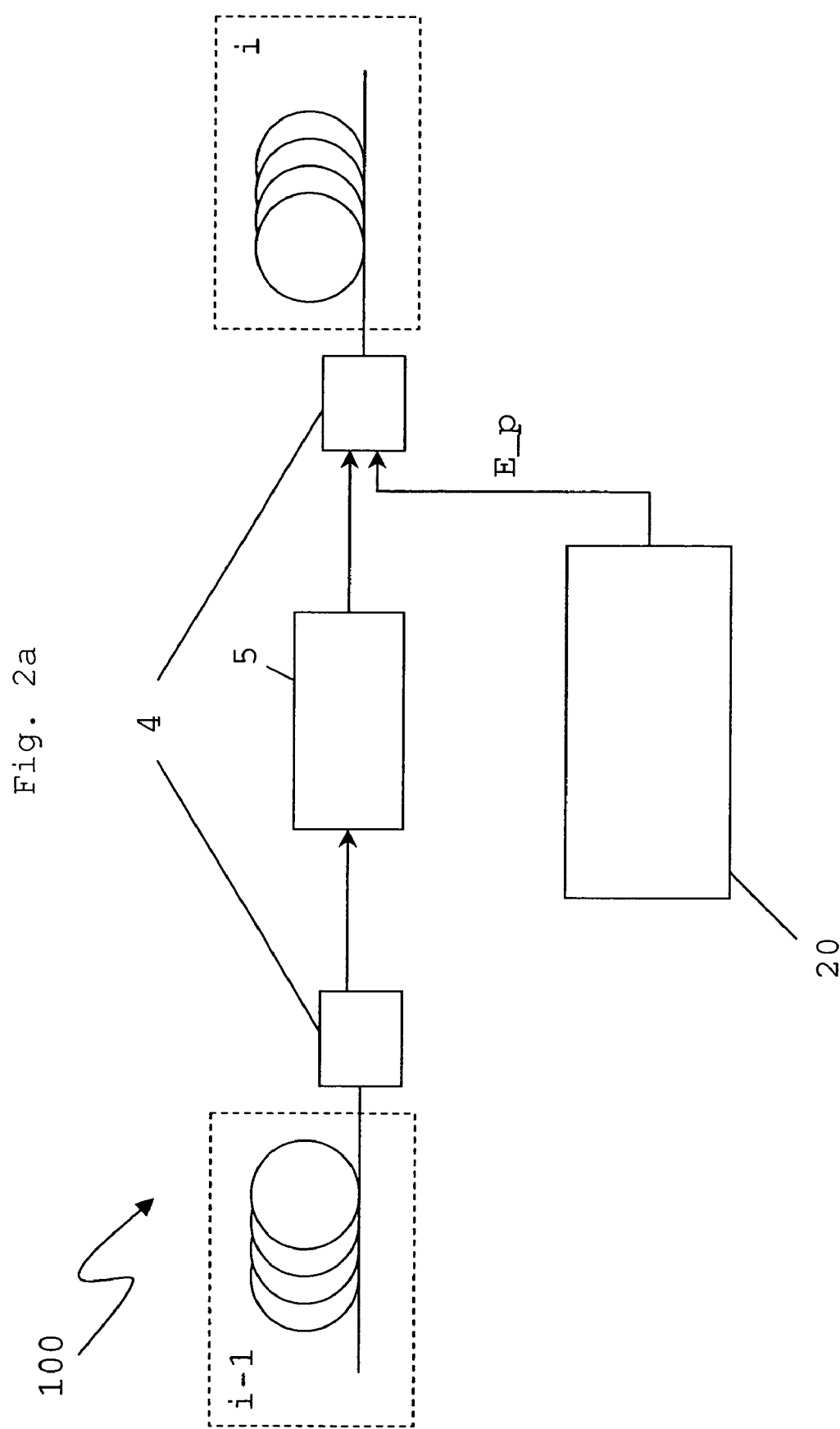

PUMP ENERGY SOURCE, METHOD OF PROVIDING PUMP ENERGY TO AN OPTICAL TRANSMISSION SYSTEM, AND OPTICAL TRANSMISSION SYSTEM

BACKGROUND OF THE INVENTION

The invention is based on a priority application EP03003635.4 which is hereby incorporated by reference.

The present invention refers to a pump energy source for providing pump energy to an optical transmission system transmitting an optical signal along an optical fiber, in particular an optical transmission system in which a beam of said pump energy is introduced to said optical fiber so that said beam of said pump energy copropagates with said optical signal.

The present invention further refers to a method of providing pump energy to an optical transmission system for transmitting an optical signal within an optical fiber, in particular an optical transmission system in which a beam of said pump energy is introduced to said optical fiber so that said beam of said pump energy copropagates with said optical signal.

The present invention moreover refers to an optical transmission system comprising one or more spans of optical fiber for transmitting an optical signal along said optical fiber, further comprising a pump energy source for providing pump energy.

Pump energy sources of the above mentioned type are widely used in optical transmission systems that comprise an optical fiber acting as a wave guide for guiding an optical signal. Since optical signals are subject to attenuation while travelling along an optical fiber, it is desirable to amplify said optical signals.

State of the art optical amplifiers are for example erbium-doped fiber amplifiers (EDFA) and Raman amplifiers the latter of which utilize the well-known stimulated Raman scattering (SRS) effect. Both of them do not require a conversion of the optical signal to the electric domain prior to amplification. In general, Raman amplifiers have the advantage that optical signal amplification is achieved directly in an ordinary optical fiber, whereas EDFA systems require e.g. erbium-doped optical fiber segments to effect an amplification.

Raman amplifiers can be set up in two different configurations: forward pumping configuration, in which a beam of pump energy copropagates with the optical signal to be amplified, and backward pumping configuration, in which a beam of pump energy counterpropagates with the optical signal to be amplified. Copropagating means that both the pump energy and the optical signal to be amplified are travelling in the same direction, whereas counterpropagating describes a state in which said pump energy and said optical signal to be amplified are travelling in opposite directions.

Forward pumping is considered to be a promising technique and can also be combined with backward pumping thus improving an optical signal-to-noise ratio (OSNR) and reducing double-Raleigh scattering.

However, present day pump energy sources such as common diode lasers have a comparatively high relative intensity noise (RIN), that is, undesired amplitude fluctuations of an output beam intensity. For most laser types, said RIN has a 1/f-characteristic which means that maximum RIN is at low modulation frequencies f. For higher frequencies, the RIN is limited by white noise which at the same time defines the minimum RIN.

Said RIN is transferred to the optical signal while said optical signal is being amplified by Raman amplification, especially in a forward pumping configuration, because the Raman scattering process on which said Raman amplification is based is nearly instantaneous. I.e. even high frequency fluctuations of said pump energy source do affect the amplification of said optical signal which is highly undesirable.

SUMMARY OF THE INVENTION

Consequently, it is an object of the present invention to provide an improved pump energy source, preferably with a low RIN, an improved optical transmission system and an improved method of providing pump energy to an optical transmission system.

This object is achieved with a pump energy source for providing pump energy to an optical transmission system transmitting an optical signal along an optical fiber, in particular an optical transmission system in which a beam of said pump energy is introduced to said optical fiber so that said beam of said pump energy copropagates with said optical signal by an auxiliary optical fiber that is capable of imparting Raman amplification to an optical signal travelling in said auxiliary optical fiber, by an auxiliary source providing an auxiliary source signal that can be introduced to said auxiliary optical fiber, and by an auxiliary pump providing an auxiliary pump signal that can be introduced to said auxiliary optical fiber so that it counterpropagates with said auxiliary source signal. I.e. said auxiliary pump signal is propagating in the opposite direction as compared to the auxiliary source signal.

Since according to the invention said auxiliary pump signal counterpropagates with said auxiliary source signal, said auxiliary source signal is amplified by Raman amplification within said auxiliary optical fiber in a backward pumping configuration which is especially advantageous with regards to RIN-transfer from said auxiliary pump signal to said auxiliary source signal.

This is because amplitude fluctuations of said auxiliary pump signal are averaged out during Raman amplification of the auxiliary source signal within backward pumping configuration, as e.g. each individual bit of a digital auxiliary source signal will see several milliseconds of the auxiliary pump signal. I.e. there is—in the interesting frequency range of e.g. 50 kHz up to 10 GHz—virtually no transfer of the RIN from the auxiliary pump signal to the auxiliary source signal.

In a lower frequency range from 0 kHz to about 10 kHz, there is a RIN-transfer of the auxiliary pump signal to the auxiliary source signal, which is due to what can be called a low-pass characteristic of the above described RIN-transfer of a backward pumping type Raman amplification. Said RIN-transfer in the lower frequency range, however, does not affect the transmission of an optical signal so amplified, because input stages of optical transmission receivers usually show pass-band behaviour within the above mentioned frequency range of about 50 kHz up to about 10 GHz.

In a forward pumping configuration, RIN-transfer shows a low-pass characteristic that is only due to the dispersion of the fiber. I.e. in a forward pumping configuration, the RIN-transfer is limited to a certain (low-pass) frequency range with cut-off frequencies in the range of tens of MHz. According to the present invention this is avoided by employing Raman amplification of said auxiliary source signal by means of backward pumping with said auxiliary pump signal.

This enables to keep a RIN of the amplified auxiliary source signal, which is obtained from backward pumping type Raman amplification of said auxiliary source signal with said auxiliary pump signal, very low.

According to an advantageous embodiment of the present invention, said auxiliary source comprises a distributed feedback (DFB)—laser, which produces an auxiliary source signal having a very low RIN. This way, further improvements regarding a low RIN of said amplified auxiliary source signal are possible. of course, it is also possible to employ other types of lasers with a very low RIN for generating the auxiliary source signal. In general, according to yet a further variant of the invention, the RIN of said auxiliary source signal is advantageously less than the RIN of said auxiliary pump signal.

In summary, the amplified auxiliary source signal has about the same low RIN as the auxiliary source signal itself over the interesting frequency range of 50 kHz up to 10 GHz.

The amplified auxiliary source signal can be used for Raman amplification of the optical signal of the optical transmission system. Because of the low RIN of the amplified auxiliary source signal, it is possible to use the amplified auxiliary source signal advantageously as a pump signal for Raman amplification of said optical signal in a forward pumping configuration.

To enable Raman amplification within said auxiliary fiber as described above, a further advantageous embodiment of the present invention suggests that a wavelength of said auxiliary source signal is higher than a wavelength of said auxiliary pump signal. In a further preferred embodiment, the wavelength difference between said auxiliary source signal and said auxiliary pump signal is within a range of about 80 nm to 120 nm for optimally using a Raman gain bandwidth associated to Raman amplification.

Yet another advantageous embodiment of the present invention is characterized in that said auxiliary source signal of said auxiliary source is depolarized and/or has a high spectral bandwidth.

Depolarization of said auxiliary source signal contributes to minimizing polarization dependence of Raman amplification.

A high spectral bandwidth reduces the influence of the Brillouin effect which describes an interaction of an optical signal with acoustic waves.

According to a further advantageous embodiment of the present invention, an optical power of said auxiliary pump signal is higher than an optical power of said auxiliary source signal to provide for sufficient energy for amplification.

According to another embodiment of the present invention, the auxiliary source signal comprises a multitude of source wavelengths so that the pump energy source can also be used in wavelength division multiplex (WDM)—optical transmission systems e.g. for simultaneously amplifying several wavelength channels of said optical signal.

A further embodiment of the present invention suggests that said auxiliary pump comprises at least one diode laser.

According to another very advantageous embodiment of the present invention, said auxiliary pump comprises at least one Raman fiber laser. This embodiment is particularly advantageous since a Raman fiber laser provides for high optical output power and is hence ideally suited for pumping another signal.

Another advantageous embodiment of the pump energy source according to the present invention is characterized in that a residual optical power of said auxiliary pump signal, that is introduced into a first end of said auxiliary optical fiber, can be retrieved at a second end of said auxiliary optical fiber. This enables to reuse the residual optical power of the auxiliary pump signal which amounts to an optical power of said auxiliary pump signal inserted to the auxiliary optical fiber at its first end minus the energy used for amplifying said auxiliary source signal, which depends on the power conversion efficiency of Raman amplification, and propagation losses during travelling from the first end to the second end of the auxiliary optical fiber.

Another solution to the object of the present invention is given by a method of providing pump energy to an optical transmission system according to the present invention.

A solution to the object of the present invention regarding said optical transmission system is characterized by said pump energy source comprising an auxiliary optical fiber that is capable of imparting Raman amplification to an optical signal travelling in said auxiliary optical fiber, an auxiliary source providing an auxiliary source signal that can be introduced to said auxiliary optical fiber, and an auxiliary pump providing an auxiliary pump signal that can be introduced to said auxiliary optical fiber so that it counterpropagates with said auxiliary source signal.

According to an advantageous embodiment of the optical transmission system, a beam of said pump energy can be introduced into said optical fiber so that said beam of said pump energy copropagates with said optical signal. The pump energy source is advantageously designed according to the present invention.

A further inventive solution provides that said pump energy of said pump energy source is introduced into a first span of said optical fiber, and in that a residual optical power of said auxiliary pump signal is retrieved so that it can be reused.

In a very advantageous embodiment of the present invention, said retrieved residual optical power is introduced to a preceding span of said optical fiber, preferably for second order backward pumping of said optical signal, i.e. there are two stages of amplification both of which provide Raman amplification of an optical signal. Thus it is possible to reuse the retrieved residual optical power with little effort within the same transmission system.

For instance, according to a further embodiment of the present invention, a first order backward pumping source is provided which provides first order backward pumping energy. An output signal of this first order backward pumping source can in turn be amplified via Raman amplification by means of said retrieved residual optical power which is introduced to said preceding span of said optical fiber together with said first order backward pumping energy thus establishing second order backward pumping.

BRIEF DESCRIPTION OF THE DRAWINGS

Further advantages and features of the present invention are presented with reference to the drawings in the following detailed description.

FIG. 2a shows a first embodiment of an optical transmission system according to the present invention.

DETAILED DESCRIPTION OF THE INVENTION

Figure 1:
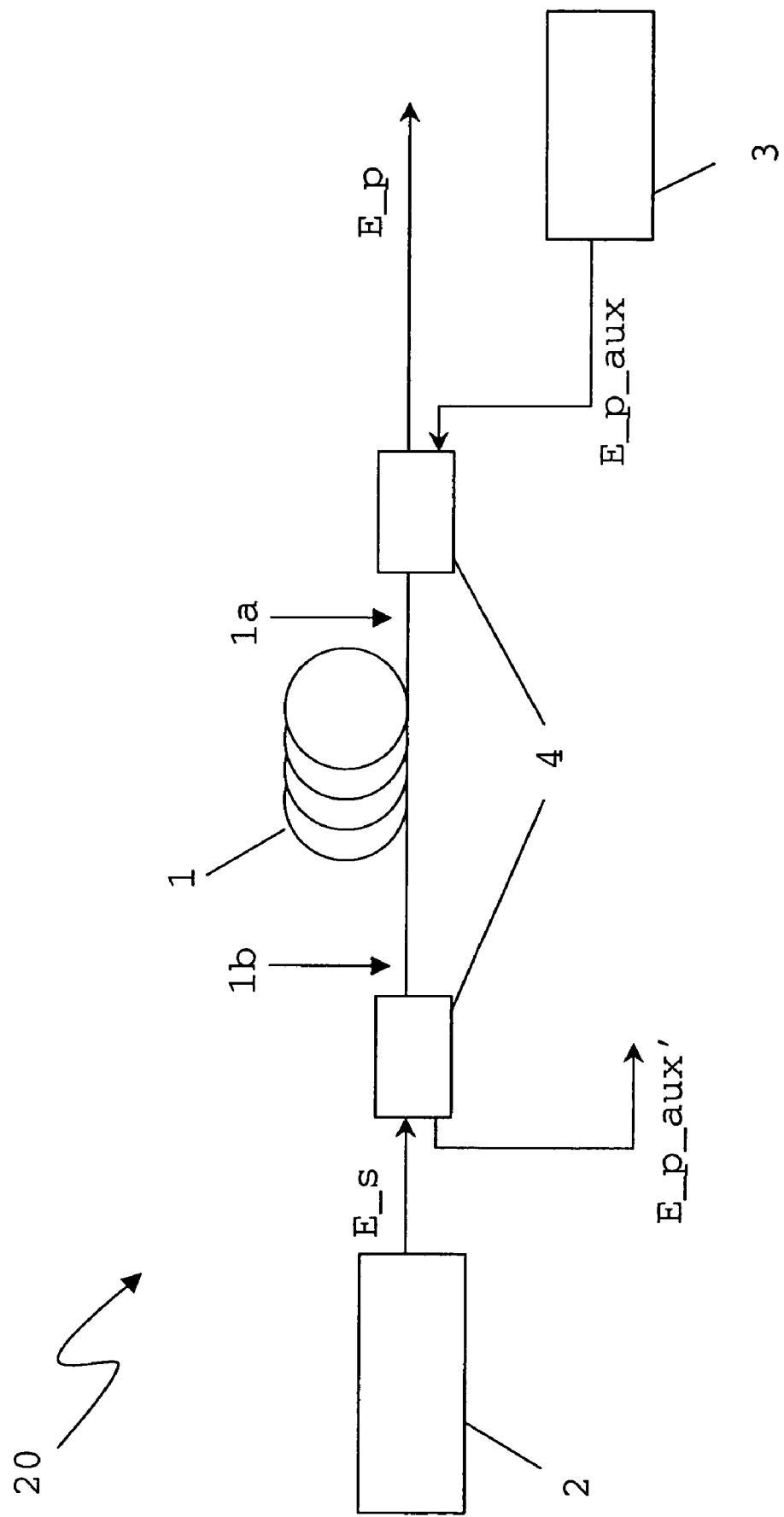
FIG. 1 shows an embodiment of the pump energy source according to the present invention.

In FIG. 1 a pump energy source 20 is displayed that provides optical pump energy E_p in form of an energy beam to an optical transmission system that is not shown in FIG. 1.

Said pump energy source 20 comprises an auxiliary fiber 1 which is capable of imparting Raman amplification to an optical signal travelling in said auxiliary optical fiber 1. Said auxiliary fiber 1 is at its first end 1a connected to an auxiliary pump 3 via a multiplexer 4. Furthermore, said auxiliary fiber 1 is at its second end 1b connected to an auxiliary source 2 via another multiplexer 4.

The auxiliary source 2 comprises a distributed feedback (DFB)—laser (not shown) which generates an auxiliary source signal E_s at a wavelength of about 1420 nm that has a very low relative intensity noise (RIN) and is introduced into said auxiliary optical fiber 1 via the multiplexer 4. Additionally, said auxiliary source signal E_s has a low optical power which is in the mw-range. The spectral bandwidth of said auxiliary source signal E_s is preferably comparatively large to avoid Brillouin scattering, in particular at further stages after an amplification of said auxiliary source signal E_s.

Since said auxiliary source signal E_s is designated to be subject to Raman amplification as described below, it is also depolarized (not shown) before entering the auxiliary optical fiber 1 in which Raman amplification will be effected to prevent a polarization dependent gain induced by the Raman amplification.

In contrast to the auxiliary source 2, the auxiliary pump 3, that e.g. comprises a diode laser (not shown), is not attached to the second end 1b of the auxiliary optical fiber 1, but to the first end 1a of the auxiliary optical fiber 1. Therefore, an auxiliary pump signal E_p_aux generated by said auxiliary pump 3 and introduced into said auxiliary optical fiber 1 via the multiplexer 4 is counterpropagating with, i.e. travelling in an opposite direction as compared to said auxiliary source signal E_s in the auxiliary optical fiber 1 whereby a backward pumping configuration is defined.

The wavelength of the auxiliary pump signal E_p_aux is about 1320 nm, i.e. one Raman order lower than the wavelength of said auxiliary source signal E_s.

Since the wavelength of said auxiliary source signal E_s is larger than the wavelength of said auxiliary pump signal E_p_aux and an optical power of said auxiliary pump signal E_p_aux is about 1 W, i.e. significantly larger than the optical power of said auxiliary source signal E_s having an optical power in the mw-range, stimulated Raman amplification is effected to said auxiliary source signal E_s within said auxiliary optical fiber 1.

The so amplified auxiliary source signal E_s leaves the auxiliary optical fiber 1 at its first end 1a through the multiplexer 4 where it can be used as pump energy E_p for pumping an optical signal e.g. by Raman amplification.

Due to the low-pass characteristic of the RIN-transfer from said auxiliary pump signal E_p_aux to said auxiliary source signal E_s and the initially low RIN of said auxiliary source signal E_s, the pump energy E_p also has a very low RIN, especially in the frequency range of 50 kHz up to 10 GHz which is used by the optical transmission system. Therefore, the pump energy E_p can be used in a forward pumping configuration for Raman amplification of an optical signal without adversely affecting said optical signal regarding its RIN.

Since power conversion efficiency of Raman amplification does usually not reach 100%, residual optical power E_p_aux' of said auxiliary pump signal E_p_aux that has not been converted to pump energy E_p can be retrieved at the second end 1b of the auxiliary optical fiber 1 and is extracted thereof by means of multiplexer 4.

This residual optical power E_p_aux' can be reused thus increasing power efficiency of the presented pump energy source 20.

A first embodiment of an optical transmission system 100 according to the present invention is displayed in FIG. 2a.

Said optical transmission system 100 comprises various spans i-1, i of optical fiber each of which is designated by a dashed rectangle in FIG. 2a. As can be seen, between the first span i and the preceding span i-1, an amplification stage is provided which is connected to the respective span i, i-1 by a multiplexer 4.

The amplification stage comprises a common erbium-doped fiber amplifier (EDFA) 5 and a pump energy source 20. Said pump energy source 20 depicted by a rectangle in FIG. 2a has a detailed structure as shown in FIG. 1.

According to the above description, the pump energy E_p output by the pump energy source 20 in form of a beam of pump energy E_p is introduced to the first span i of the optical transmission system 100 via the multiplexer 4. The pump energy E_p is copropagating with an optical signal (not shown) transmitted—from the left to the right in FIG. 2a—along said spans i-1, i of optical fiber and can thus effect a Raman amplification of said optical signal. In this case, the Raman amplification is of the forward pumping type. Nevertheless, since the beam of pump energy E_p has a very low RIN according to the present invention, any RIN-transfer from said pump energy E_p to said optical signal will not adversely affect said optical signal.

Figure 2B:
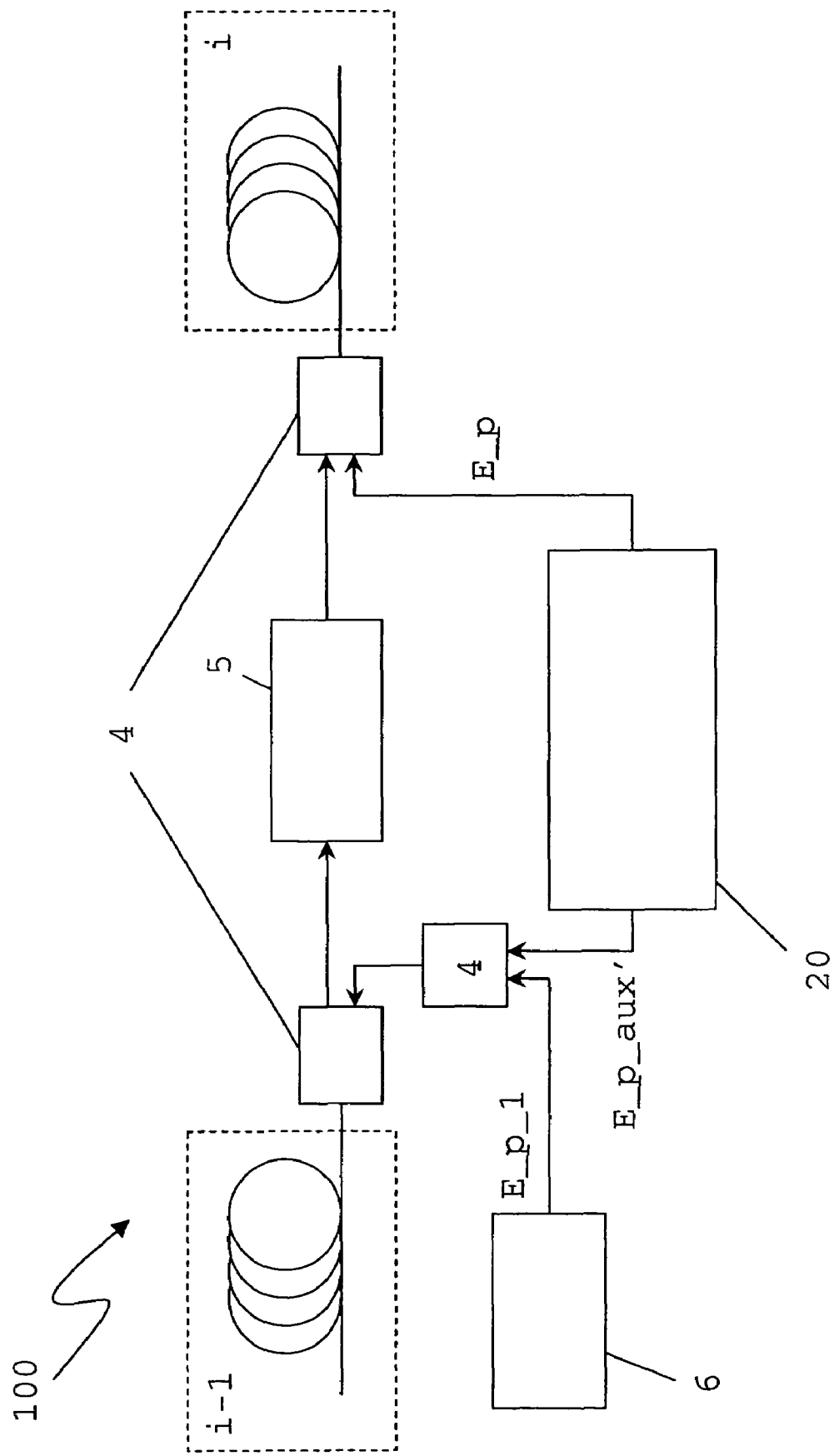
FIG. 2b shows a second embodiment of the optical transmission system according to the present invention.

A further embodiment of the optical transmission system 100 is shown in FIG. 2b.

As can be seen, the retrieved residual optical power E_p_aux', cf. also FIG. 1, is fed to another multiplexer 4 together with a beam of first order backward pumping energy E_p_1.

The first order backward pumping energy E_p_1 is generated in a first order backward pumping source 6 that comprises a multitude of diode lasers and is amplified via Raman amplification by said retrieved residual optical power E_p_aux' obtained from said pump energy source 20. This way it is possible to reuse the retrieved residual optical power E_p_aux'. The so amplified first order backward pumping energy E_p_1 is then used for Raman amplification of the optical signal travelling along the preceding span i-1 of optical fiber in a backward pumping configuration.

In addition to the EDFA 5 and the pump energy source 20, the amplification stage also comprises means for dispersion compensation (not shown) to reduce the adverse effects of dispersion on the signal quality of the optical signal.

According to a preferred embodiment of the invention, the auxiliary source signal E_s comprises a multitude of source wavelengths which may be achieved by combining a plurality of source signals with different wavelengths, preferably each of them having a low RIN, that may e.g. be generated by separate laser modules (not shown).

According to another preferred embodiment of the invention, the auxiliary pump 3 comprises at least one Raman fiber laser (not shown) which is ideally suited for optical pumping purposes due to its high optical output power.

The invention claimed is:

1. Pump energy source for providing pump energy to an optical transmission system which transmits an optical signal along an optical fiber, and in which a beam of said pump energy is introduced into said optical fiber so that said beam of said pump energy copropagates with said optical signal, with an auxiliary optical fiber that imparts Raman amplification to an optical signal travelling in said auxiliary optical fiber, with an auxiliary source providing an auxiliary source signal that is introduced into said auxiliary optical fiber, and with an auxiliary pump providing an auxiliary pump signal that is introduced into said auxiliary optical fiber so that said auxiliary pump signal counterpropagates with said auxiliary source signal in a direction opposite to that of said auxiliary source signal.

2. Pump energy source according to claim 1, wherein a wavelength of said auxiliary source signal is longer than a wavelength of said auxiliary pump signal.

3. Pump energy source according to claim 1, wherein said auxiliary source signal of said auxiliary source is depolarized and/or has a high spectral bandwidth.

4. Pump energy source according to claim 1, wherein an optical power of said auxiliary pump signal is higher than an optical power of said auxiliary source signal.

5. Pump energy source according to claim 1, wherein a relative intensity noise of said auxiliary source signal is less than a relative intensity noise of said auxiliary pump signal.

6. Pump energy source according to claim 1, wherein said auxiliary source signal comprises a multitude of source wavelengths.

7. Pump energy source according to claim 1, wherein said auxiliary pump comprises at least one diode laser and/or Raman fiber laser.

8. Pump energy source according to claim 1, wherein said auxiliary source comprises a distributed feedback-laser.

9. Pump energy source according to claim 1, wherein a residual optical power of said auxiliary pump signal, that is introduced into a first end of said auxiliary optical fiber, is retrieved at a second end of said auxiliary optical fiber.

10. Method of providing pump energy from a pump energy source to an optical transmission system which transmits an optical signal within an optical fiber, and in which a beam of said pump energy is introduced into said optical fiber so that said beam of said pump energy copropagates with said optical signal, said method comprising the following steps:
introducing an auxiliary source signal into an auxiliary optical fiber that imparts Raman amplification to an optical signal travelling therein, and
introducing an auxiliary pump signal into said auxiliary optical fiber so that said auxiliary pump signal counterpropagates with said auxiliary source signal in a direction opposite to that of said auxiliary source signal.

11. Method of providing pump energy from a pump energy source to an optical transmission system which transmits an optical signal within an optical fiber, and in which a beam of said pump energy is introduced into said optical fiber so that said beam of said pump energy copropagates with said optical signal, said method comprising the following steps:
introducing an auxiliary source signal into an auxiliary optical fiber that imparts Raman amplification to an optical signal travelling therein,
introducing an auxiliary pump signal into said auxiliary optical fiber so that said auxiliary pump signal counterpropagates with said auxiliary source signal in a direction opposite to that of said auxiliary source signal, and
generating said beam of pump energy by the pump energy source.

12. Optical transmission system comprising one or more spans of optical fiber for transmitting an optical signal along said optical fiber, further comprising a pump energy source for providing pump energy to said optical transmission system, wherein said pump energy source comprises an auxiliary optical fiber that imparts Raman amplification to an optical signal travelling in said auxiliary optical fiber, an auxiliary source providing an auxiliary source signal that is introduced into said auxiliary optical fiber, and an auxiliary pump providing an auxiliary pump signal that is introduced into said auxiliary optical fiber so that said auxiliary pump signal counterpropagates with said auxiliary source signal in a direction opposite to that of said auxiliary source signal.

13. Optical transmission system according to claim 12, wherein a beam of said pump energy is introduced into said one or more spans of optical fiber so that said beam of said pump energy copropagates with said optical signal in said one or more spans.

14. Optical transmission system according to claim 12, wherein said auxiliary source signal has a wavelength longer than that of said auxiliary pump signal.

15. Optical transmission system according to claim 12, wherein said pump energy of said pump energy source is introduced into a first span of said optical fiber, and a residual optical power of said auxiliary pump signal is retrieved.

16. Optical transmission system according to claim 15, wherein said retrieved residual optical power is introduced to a preceding span of said optical fiber for second order backward pumping of said optical signal.

17. Optical transmission system according to claim 16, further comprising a first order backward pumping source.

* * * * *